United States Patent
Wang

(10) Patent No.: US 10,601,118 B2
(45) Date of Patent: Mar. 24, 2020

(54) ANTENNA SYSTEM AND MOBILE TERMINAL

(71) Applicant: AAC Technologies Pte. Ltd., Singapore (SG)

(72) Inventor: Aqi Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/524,048

(22) Filed: Jul. 27, 2019

(65) Prior Publication Data
US 2020/0044312 A1 Feb. 6, 2020

(30) Foreign Application Priority Data
Aug. 3, 2018 (CN) .............. 2018 2 1255117 U

(51) Int. Cl.
| | | |
|---|---|---|
| *H01Q 1/24* | (2006.01) | |
| *H01Q 7/00* | (2006.01) | |
| *H01Q 21/30* | (2006.01) | |
| *H01Q 1/22* | (2006.01) | |
| *H01Q 9/04* | (2006.01) | |
| *G06F 13/38* | (2006.01) | |

(52) U.S. Cl.
CPC .......... *H01Q 1/243* (2013.01); *G06F 13/387* (2013.01); *H01Q 1/2258* (2013.01); *H01Q 9/0442* (2013.01); *G06F 2213/3814* (2013.01)

(58) Field of Classification Search
None
See application file for complete search history.

(56) References Cited

U.S. PATENT DOCUMENTS

| | | | | |
|---|---|---|---|---|
| 8,970,434 B2 * | 3/2015 | Kanj | ............ | H01Q 1/243 |
| | | | | 343/700 MS |
| 9,590,291 B2 * | 3/2017 | Lee | ............ | H01Q 7/00 |
| 9,774,083 B2 * | 9/2017 | Liu | ............ | H04L 25/02 |
| 10,090,581 B2 * | 10/2018 | Wu | ............ | H01Q 1/243 |
| 10,199,719 B2 * | 2/2019 | Kim | ............ | H01Q 1/243 |
| 10,439,267 B2 * | 10/2019 | Seo | ............ | H01Q 21/28 |
| 2015/0372384 A1 * | 12/2015 | Liu | ............ | H04L 25/02 |
| | | | | 343/860 |
| 2016/0056531 A1 * | 2/2016 | Lee | ............ | H01Q 7/00 |
| | | | | 343/702 |
| 2016/0301138 A1 * | 10/2016 | Hwang | ............ | H01Q 9/42 |
| 2017/0170562 A1 * | 6/2017 | Lee | ............ | H01Q 1/243 |

* cited by examiner

*Primary Examiner* — Tuan A Tran
(74) *Attorney, Agent, or Firm* — W&G Law Group LLP

(57) ABSTRACT

An antenna system and a mobile terminal are provided. The antenna system includes a metal frame including a bottom frame located at the bottom thereof; a main board received in the metal frame, the main board including a system ground and a feeding point; a tuning switch arranged on the main board; a USB interface provided on the main board and having a metal shell; and a metal part arranged across one side of the USB interface facing away from the main board. A clearance region is formed by the bottom frame and the mainboard. The USB interface and the metal part are coupled to the bottom frame to form an antenna radiator, and the USB interface, the metal part, the bottom frame, the feeding point, the tuning switch and the system ground together constitute an antenna unit.

16 Claims, 6 Drawing Sheets

ANTENNA SYSTEM AND MOBILE TERMINAL

TECHNICAL FIELD

The present disclosure relates to the field of communication technologies and, in particular, to an antenna system and a mobile terminal.

BACKGROUND

For existing mobile terminals with antennas, such as a mobile phone, a tablet PC and the like, due to requirements on size and wiring, a USB interface is generally positioned at the center, while an antenna bracket is partially disconnected at the USB interface, and an antenna is very close to the USB interface in position. Since the USB interface is a metal conductive shell and the shell is grounded, generally, when the antenna works, the USB interface is coupled with an antenna radiator and may absorb energy from the antenna, so that the overall performance of the antenna is reduced and sensitivity of the antenna is reduced.

Therefore, it is necessary to provide an improved antenna system so as to solve the above problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
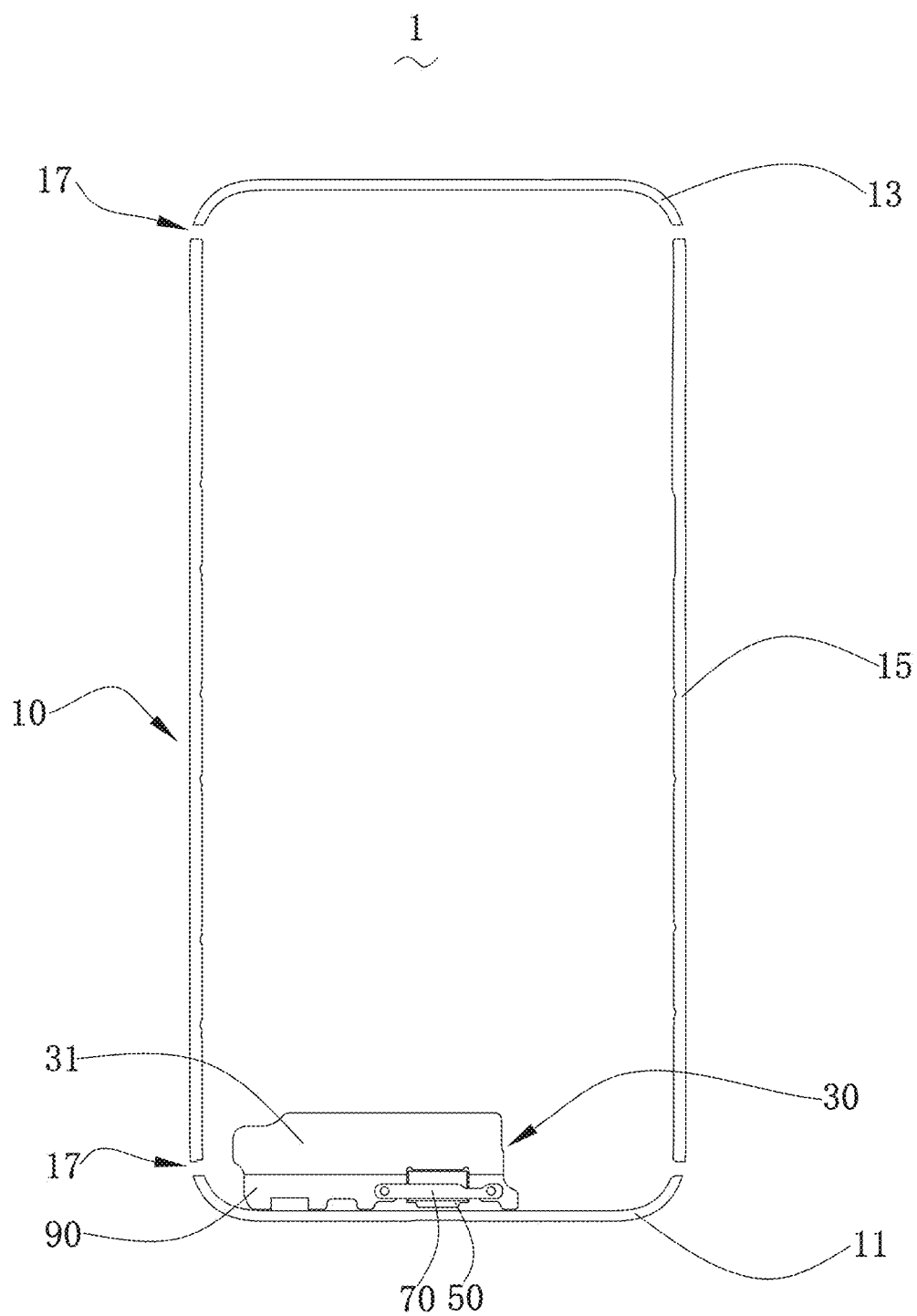
FIG. 1 is a structural schematic diagram of an antenna system according to the present disclosure viewing from a certain perspective.
Figure 2:
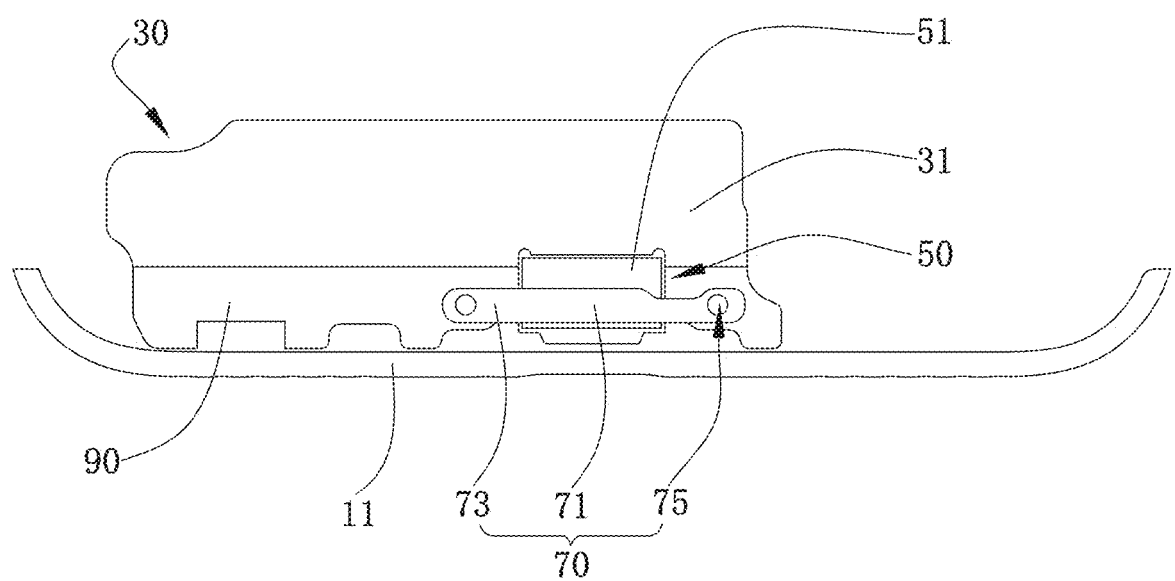
FIG. 2 is a partial structural schematic diagram of the antenna system as shown in FIG. 1.
Figure 3:
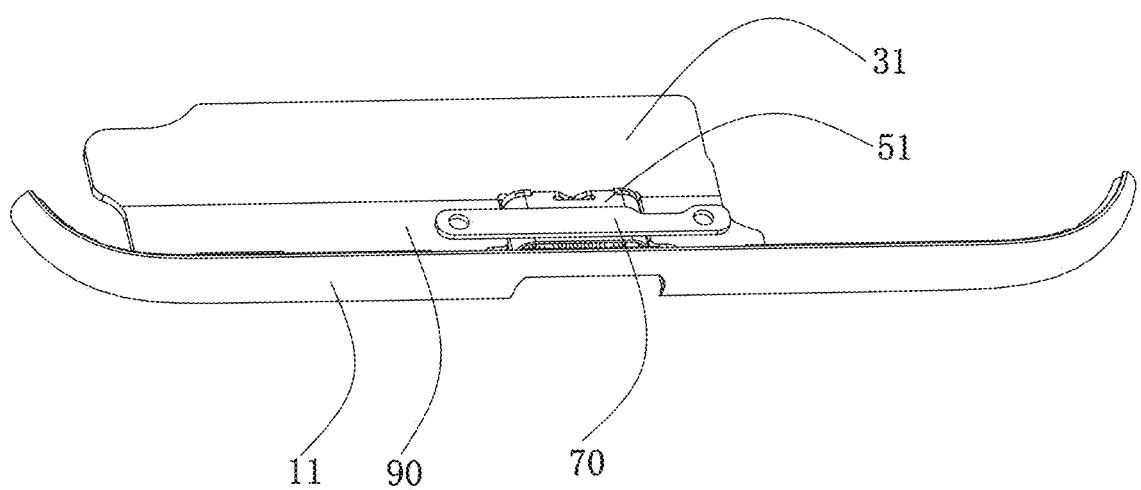
FIG. 3 is a perspective structural schematic diagram of the antenna system as shown in FIG. 2.

As shown in FIG. 1 to FIG. 3, an embodiment of the present disclosure provides an antenna system 1, and the antenna system 1 can be applied to mobile terminals such as a cellphone, a tablet PC and the like. Generally, the mobile terminals such as the cellphone, the tablet PC and the like are of a rectangle or rounded rectangle structure having a length direction and a width direction.

The antenna system 1 includes a metal frame 10, a main board 30 received in the metal frame 10, a tuning switch arranged on the main board 30, a USB interface 50 provided on the main board 30, and a metal part 70 arranged across the USB interface 50.

The metal frame 10 includes a bottom frame 11, a top frame 13 arranged opposite to the bottom frame 11 and two middle frames located between the bottom frame 11 and the top frame 13. Breaches 17 are respectively provided between two opposite ends of the bottom frame 11 and the two middle frames 15 and between two opposite ends of the top frame 13 and the two middle frames 15. For example, there are four breaches 17, two breaches 17 are located between the bottom frame 11 and the middle frames 15 and directly facing toward each other, and the other two breaches 17 are located between the top frame 13 and the middle frames 15 and directly facing toward each other, i.e., along the length direction of the mobile terminal, two breaches 17 are respectively provided on both sides of the metal frame 10, and the breaches 17 directly facing toward each other so as to reduce the processing difficulty.

It should be noted that the breach 17 is filled with a nonconductive material so as to ensure structural strength and appearance texture of the mobile terminal.

The main board 30 includes a system ground 31 and a feeding point. The bottom frame 11 is connected with the feeding point, and the USB interface 50 is connected with the system ground 31.

Clearance regions 90 are formed on the main board at both sides of the USB interface 50, and the larger an area of the clearance region, the higher performance of the antenna.

The USB interface 50 is provided the main board 30 for communication. The USB interface 50 includes a metal shell 51, one end of the metal shell 51 facing away from the bottom frame 11 is grounded, for example, one end of the metal shell 51 facing away from the bottom frame 11 is grounded by the tuning switch, and the tuning switch is used for fine tuning a resonant frequency. In this embodiment, the tuning switch is an inductive tuning switch. In other embodiments, in order to cover different frequencies, of course, the tuning switch may also be other types of tuning switches according to actual demands.

The metal part 70 is arranged across one side of the USB interface 50 facing away from the main board 30. In this embodiment, the metal part 70 is of a strip structure and positioned over the USB interface, and the USB interface 50 is sandwiched between the main board 30 and the metal part 70. The metal part 70 includes a body portion 71 arranged directly facing toward the metal shell 51, two extending portions 73 horizontally extending from two ends of the body portion 71 along a direction facing away from the body portion 71, and two mounting holes 75 respectively formed by penetrating through the two extending portions 73. Screws pass through the mounting holes 75 to abut against the main board 30 to fix the USB interface 50 with the main board 30, and the screws are electrically isolated from the main board 30. For example, the screw may be made of a non-insulating material, or a portion of the main board abutting against the screw is made of non-insulating material, or both the screws and the portions of the main board abutting against the screws are made of non-insulating materials.

In this embodiment, the metal part 70 is used for fixing the USB interface 50, and of course, in other embodiments, the metal part 70 may be only arranged across the USB interface and abutting against the USB interface or provided on the USB interface by an insulation structure. In this case, the USB interface can be locked on the main board 30 or a plastic back shell by the screw. When the metal part 70 is used for fixing the USB interface, the body portion 71 of the metal part 70 is fixedly connected with the USB interface 50.

In this embodiment, orthogonal projections of the two extending portions 73 on the main board 30 completely fall within the clearance regions 90.

In this embodiment, the metal part 70 reinforces the coupling between the USB interface 50 and the bottom frame 11 and functions as varying the coupling resonance, and according to different shapes of the metal part 70, obtained coupling frequencies are also different.

In this embodiment, the USB interface 50 and the metal part 70 are coupled to the bottom frame 11 to form an antenna radiator. The bottom frame 11 is connected with the feeding point. One end of the metal shell 51 of the USB interface 50 facing away from the bottom frame 11 is connected with the system ground 31 by the tuning switch. The USB interface 50, the metal part 70, the bottom frame 11, the feeding point, the tuning switch and the system ground 31 together constitute an antenna unit. The metal part 70 is of a strip structure, the tuning switch is an inductive tuning switch, and a working frequency band of the antenna unit includes 2,500-2,690 MHz.

In other embodiments, in order to obtain other frequencies, it can also be achieved by improving the shape of the antenna radiator, the area of the clearance region and the tuning switch, and for example, the metal part 70 may be of a quasi U shape or other shapes, and by changing the shape of the metal part 70, different coupling frequencies, such as an middle frequency and even a low frequency can be obtained.

Figure 4:
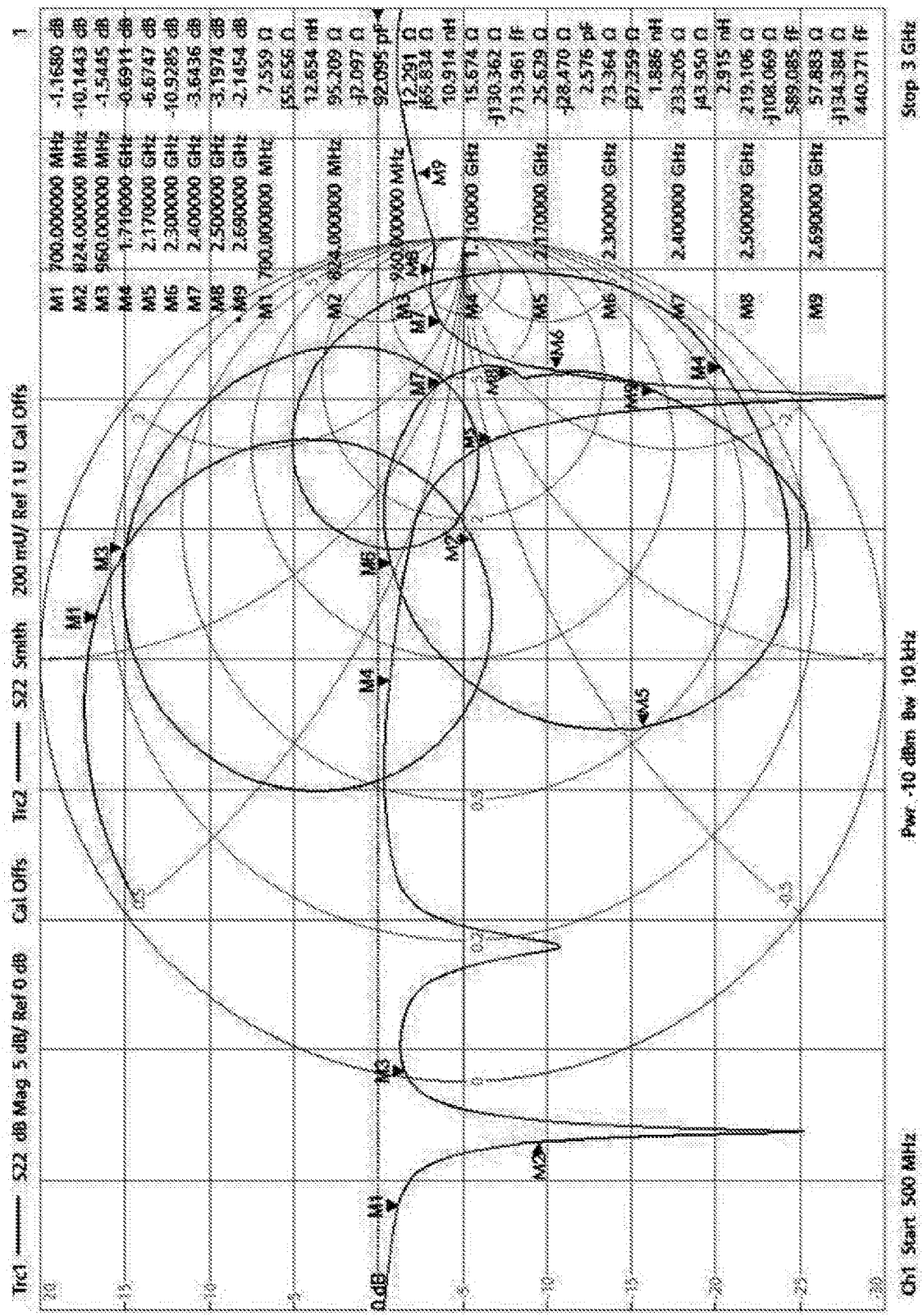
FIG. 4 is a reflection coefficient curve and Smith chart when a bottom frame is used as an antenna unit of an antenna radiator according to the present disclosure.
Figure 5:
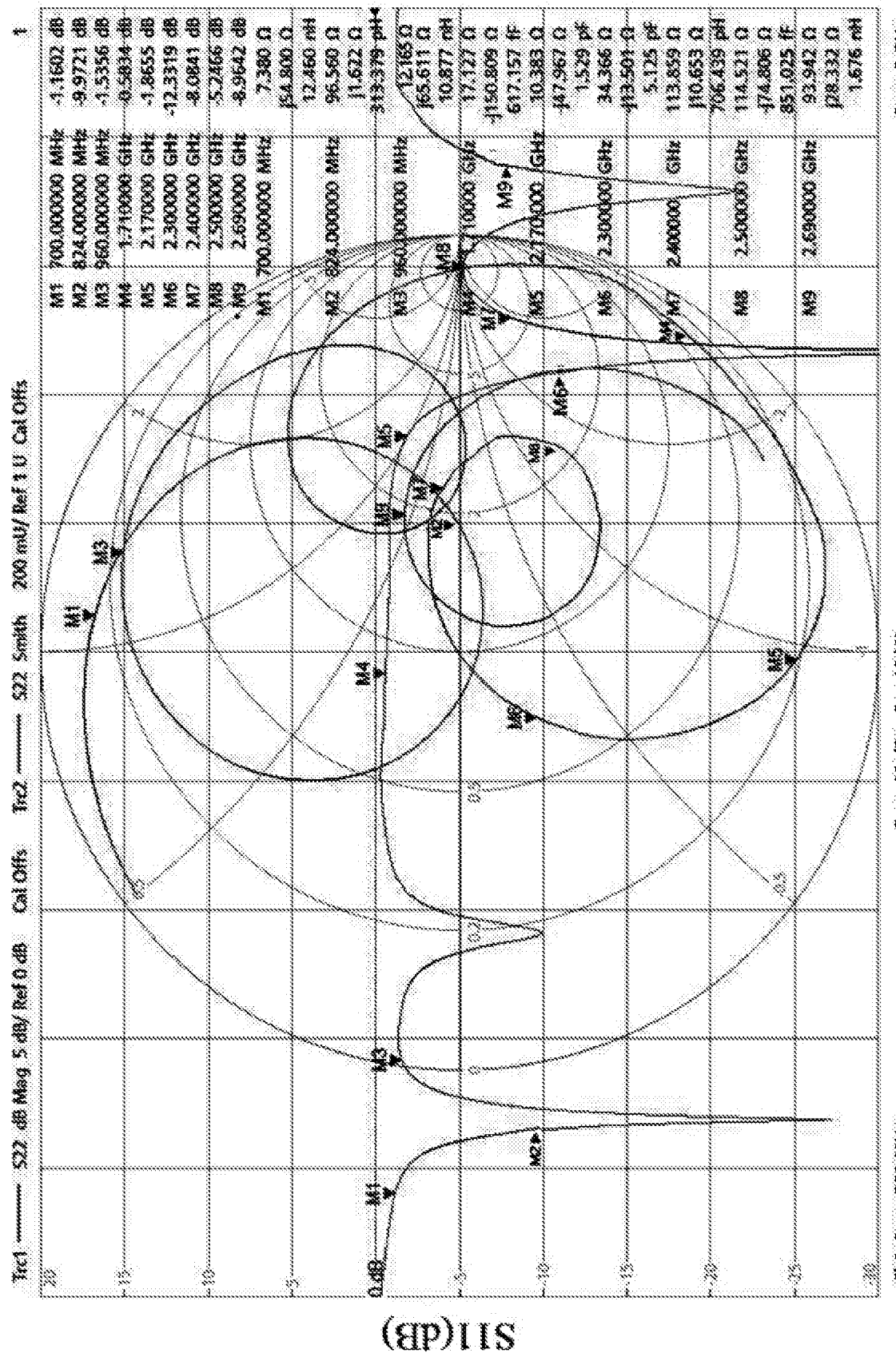
FIG. 5 is a reflection coefficient curve and Smith chart when a bottom frame, a USB interface and a metal part are used as an antenna unit of an antenna radiator according to the present disclosure.
Figure 6:
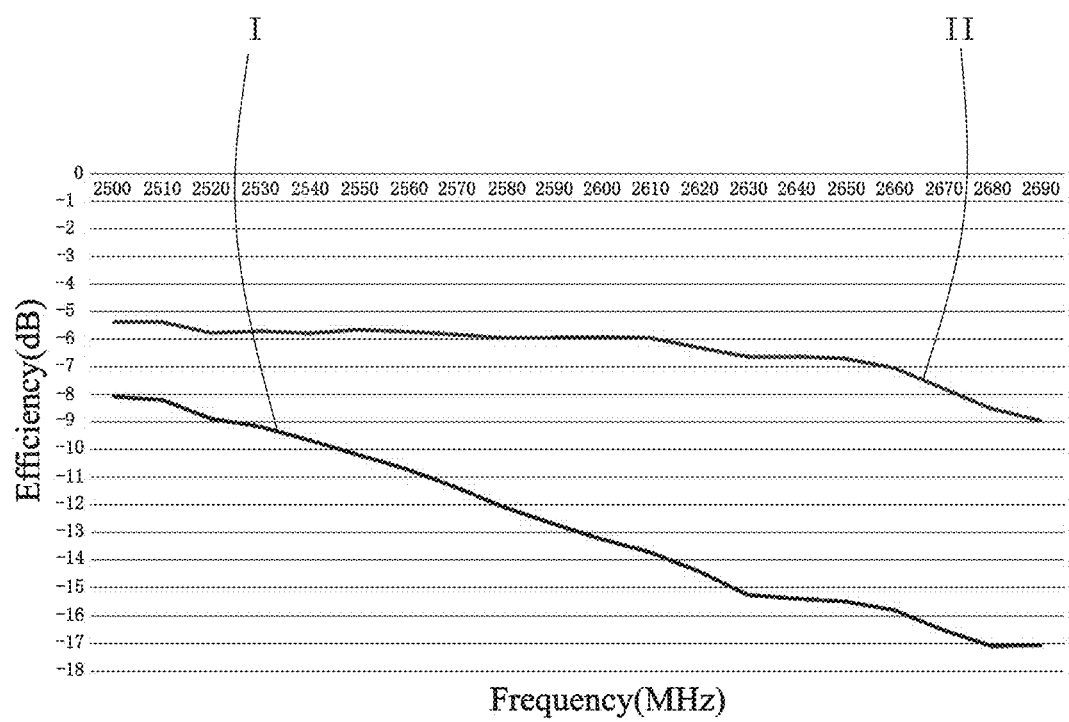
FIG. 6 is a comparison diagram between a radiation efficiency curve when the bottom frame is used as the antenna unit of the antenna radiator and a radiation efficiency curve when the bottom frame, the USB interface and the metal part are used as the antenna unit of the antenna radiator according to the present disclosure.

With reference to FIG. 4 to FIG. 6, FIG. 4 is a reflection coefficient curve and Smith chart when the bottom frame is used as the antenna unit of the antenna radiator, FIG. 5 is a reflection coefficient curve and Smith chart when the bottom frame, the USB interface and the metal part are used as the antenna unit of the antenna radiator according to the present disclosure, and FIG. 6 is a comparison diagram between a radiation efficiency curve when the bottom frame is used as the antenna unit of the antenna radiator and a radiation efficiency curve when the bottom frame, the USB interface and the metal part are used as the antenna unit of the antenna radiator. A line I represents the radiation efficiency curve when the bottom frame is used as the antenna unit of the antenna radiator, and a line II represents the radiation efficiency curve when the bottom frame, the USB interface and the metal part are used as the antenna unit of the antenna radiator. It can be known by comparing FIG. 4 to FIG. 5 that a resonant waveform of the antenna system provided by the present disclosure on the frequency band of 2,500-2,690 MHz is deeper, and it can be known from FIG. 6 that when the working frequency band is within the range of 2,500-2,690 MHz, radiation efficiency of the antenna is higher, and thus, the performance of the antenna system provided by the present disclosure is excellent.

The present disclosure further provides a mobile terminal. The mobile terminal has the technical features of the antenna system as described above, and thus also has the above-mentioned technical effects when adopting the antenna system.

According to the antenna system 1 provided by the present disclosure, by using the USB interface 50 as one part of the antenna radiator and combining the metal part 70 together, the USB interface 50 and the metal part 70 are coupled to the bottom frame 11 to form the antenna radiator, so as to solve the technical problem of the prior art that, energy radiated by the antenna may be absorbed by the USB interface due to the USB interface is coupled to the antenna radiator which may reduce overall performance of the antenna. The working frequency band covered by the antenna unit includes 2,500-2,690 MHz, and the antenna system has the advantages of small reflection coefficient and high radiation efficiency.

The above are merely embodiments of the present disclosure, and it should be noted that those skilled in the art can make improvements without departing from the inventive concept of the present disclosure, however, these improvements shall belong to the protection scope of the present disclosure.

What is claimed is:

1. An antenna system, comprising:
   a metal frame comprising a bottom frame located at a bottom thereof;
   a main board received in the metal frame, the main board comprising a system ground and a feeding point;
   a tuning switch arranged on the main board;
   a USB interface stacked on the main board and having a metal shell; and
   a metal part arranged across one side of the USB interface facing away from the main board,
   wherein the bottom frame is connected with the feeding point, and a clearance region is formed by the bottom frame and a portion of the mainboard located at both sides of the metal shell, one end of the metal shell facing away from the bottom frame is connected with the system ground by the tuning switch,
   the USB interface and the metal part are coupled to the bottom frame to form an antenna radiator, and
   the USB interface, the metal part, the bottom frame, the feeding point, the tuning switch and the system ground together constitute an antenna unit.

2. The antenna system as described in claim 1, wherein the metal part is of a strip structure and crosses over the USB interface, and the USB interface is sandwiched between the main board and the metal part.

3. The antenna system as described in claim 2, wherein the tuning switch is an inductive tuning switch.

4. The antenna system as described in claim 3, wherein a working frequency band of the antenna unit comprises 2,500-2,690 MHz.

5. The antenna system as described in claim 4, wherein the metal part comprises:
   a body portion directly facing toward the metal shell;
   two extending portions horizontally extending from two ends of the body portion along a direction facing away from the body portion; and
   two mounting holes respectively penetrating through the two extending portions,
   wherein screws pass through the two mounting holes to be abutted against the main board to fix the USB interface with the main board, and the screws are electrically insulated from the main board.

6. The antenna system as described in claim 5, wherein orthogonal projections of the two extending portions on the main board completely fall within the clearance region.

7. The antenna system as described in claim 5, wherein the metal shell is fixedly connected with the body portion.

8. The antenna system as described in claim 3, wherein the metal part comprises:
   a body portion directly facing toward the metal shell;
   two extending portions horizontally extending from two ends of the body portion along a direction facing away from the body portion; and two mounting holes respectively penetrating through the two extending portions, wherein screws pass through the two mounting holes to be abutted against the main board to fix the USB interface with the main board, and the screws are electrically insulated from the main board.

9. The antenna system as described in claim 8, wherein orthogonal projections of the two extending portions on the main board completely fall within the clearance region.

10. The antenna system as described in claim 8, wherein the metal shell is fixedly connected with the body portion.

11. The antenna system as described in claim 2, wherein the metal part comprises:
 a body portion directly facing toward the metal shell;
 two extending portions horizontally extending from two ends of the body portion along a direction facing away from the body portion; and
 two mounting holes respectively penetrating through the two extending portions,
 wherein screws pass through the two mounting holes to be abutted against the main board to fix the USB interface with the main board, and the screws are electrically insulated from the main board.

12. The antenna system as described in claim 11, wherein orthogonal projections of the two extending portions on the main board completely fall within the clearance region.

13. The antenna system as described in claim 11, wherein the metal shell is fixedly connected with the body portion.

14. The antenna system as described in claim 1, wherein the metal frame comprises a top frame arranged opposite to the bottom frame and two middle frames located between the bottom frame and the top frame, and breaches are respectively provided between two opposite ends of the bottom frame and the two middle frames and between two opposite ends of the top frame and the two middle frames.

15. A mobile terminal, comprising the antenna system as described in claim 1.

16. A mobile terminal, comprising the antenna system as described in claim 2.

* * * * *